Dec. 12, 1961  H. E. GOLDBERG  3,012,465
INDUSTRIAL REFRACTOMETERS
Filed Nov. 3, 1960

INVENTOR
Herbert E. Goldberg

BY

ATTORNEY

United States Patent Office 3,012,465
Patented Dec. 12, 1961

3,012,465
INDUSTRIAL REFRACTOMETERS
Herbert E. Goldberg, R.D. 2, Keene, N.H.
Filed Nov. 3, 1960, Ser. No. 67,070
2 Claims. (Cl. 88—14)

This invention is a continuation in part of my pending patent application Serial No. 531,646, filed August 31, 1955, issued as Patent No. 2,966,091, December 27, 1960. It relates to refractometers, and more particularly to the type which is based on the measurement of the critical angle of total reflection and generally used in the chemical and food processing industries.

Most refractometers of this type are visual instruments in which the position of a boundary line, dividing the field of vision into bright and dark portions, is observed against a fixed scale. In other cases the boundary line is made to coincide with a reticle through a calibrated manual control and the reading is given by the position of this control.

It is an object of the present invention to provide an automatically indicating, recording and/or controlling refractometer of the critical angle type in which the position of the boundary line is monitored by substantially electrical means.

It is a further object of the invention to provide an instrument which gives readings unaffected by changes of the supply voltages, the color, turbidity, optical characteristics or temperature of the substances to be controlled.

The operation of such refractometers is explained in detail in the following specification and in the attached drawings in which.

Figure 1A:
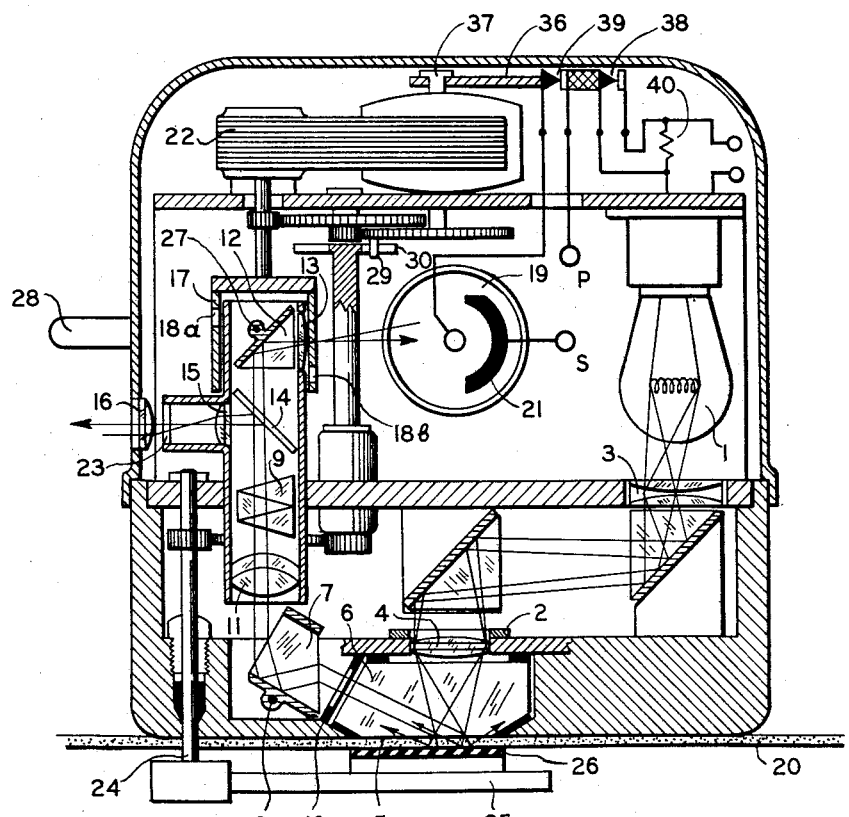
FIGURE 1a is a cross sectional view in elevation of a process refractometer based on the measurement of the critical angle of total reflection.

A refractometer of the critical angle type is shown in FIGURE 1a. It is composed of an illuminating unit, a prism, and an imaging system. In the illuminating unit a light source 1 of the concentrated filament type is imaged in the aperture 2 by the condenser lens 3. An objective lens 4 forms an image of the condenser lens 3 on the face 5 of the main prism 6, providing there an area of substantially uniform illumination.

The image forming part of the refractometer consists of the main prism 6, a deviation prism 7, which pivots about an axis 8, normal to the plane of the drawing, a rotatable compensation prism 9 which may be replaced by a filter or omitted in some cases. It also comprises an aperture stop 10, an objective lens 11, a deflecting prism 12, a field lens 13, and in some cases a semi-transparent mirror 14, a second field lens 15, and an eye-piece 16, and a scale 23.

The photoelectric sensing system is composed of a scanning drum 17, carrying a helical slot 18a, b, and a photoelectric cell 19 which may be of the multiplier type. If necessary a second photoelectric tube could be substituted for the eye lens 16.

The layer of the substance 20 to be checked is in contact with face 5 of prism 6. It is illuminated as explained above and acts by diffusion as a secondary light source. In some special cases an optical system illuminating the substance 20 from below by transmission may be useful, especially in bench refractometers where it could be swung out of the way for cleaning of the face of prism 6. After refraction at the face 5 the light flux is brought to focus by the image forming system, producing the well known shadow in the image plane of the refractometer which is located in the image plane at the field lens 13. The field lens 13 forms an image of aperture stop 10 on the photosensitive surface 21. In this way the same area of the photo surface is used regardless of changes of refractive index.

The scanning drum 17 carries a helical slot 18a, b. When the drum is rotated by a motor 22, the portion of the slot which covers the field lens 13 will move across the image plane in a vertical direction repeating this motion periodically once for each turn of the drum 17.

It is of course, equally feasible to generate scanning action by moving one of the optical elements, such as prism 12, and keeping the scanning slit stationary.

Figure 1B:
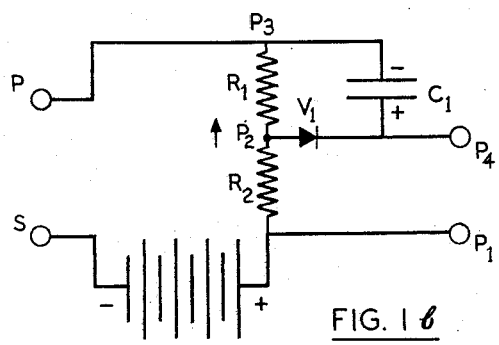
FIGURE 1b shows schematically a circuit useful for detecting the position of the center of the shadow boundary in the image plane of the refractometer.

The photoelectric tube 19 is connected to a condenser-resistor-rectifier network shown in FIGURE 1b which serves to fix the time at which a scanning slit passes the center of the shadow boundary in the image plane.

As the bright portion of the image is passed by the scanning slit a relatively heavy current flows through the load resistors $R_1$ and $R_2$ in the direction of the arrow. The condenser $C_1$ is thus charged through rectifier $V_1$ to the polarity shown in the drawing. However, as the boundary of the shadow is passed by the scanning slit, the load current decreases and the potentials of points $P_2$ and $P_3$ rise. If the time constant of the condenser-rectifier combination $C_1$ and $V_1$ is large compared to the duration of the scanning cycle, the potential drop across condenser $C_1$ will remain substantially constant and the potential of point $P_4$ will rise above $P_2$ and will reach that of point $P_1$ when the load current has dropped to half its original value. This indicates that the scanning slot has travelled half way across the boundary of the shadow. The time elapsed from the start of the scanning cycle to the instant when potentials of $P_4$ and $P_1$ are equal depends on the position of the boundary of the shadow in the image plane and is a measure of the refractive index of the substance 20 in contact with main prism 6.

Several auxiliary devices are important to insure proper functioning of the circuits in certain cases.

Sometimes, when the substance is very clear, not enough light is scattered back into the instrument. A diffusing screen must then be provided close to face 5 of prism 6. On the other hand, if the substance in contact with the prism is very turbid, it is apt to deposit solid particles, and the prism face should be cleaned from time to time. A motor driven wiper shown in FIGURE 1 serves both purposes. It consists of a shaft 24, a blade holder 25, and one or more blades 26 made of white rubber or similar material. Shaft 24 executes a slow motion pushing the blade 26 across prism face 5. When in the position shown in the drawing, the blade edge is illuminated and serves as diffusing screen and secondary light source.

For a reliable and simple electronic circuit the greatest possible illumination should be provided at the prism face 5. Since strictly continuous measurements are not normally required in the food and chemical industries, the illumination may be raised temporarily by increasing the lamp voltage above the nominal value whenever the measuring system is active. In a typical case, measurements might be made twice a minute for a three second period each. The wiper would be at rest most of the time, would be driven at a suitable rate by an intermittent mechanism and come to rest again in the correct position on or near the prism face just before a measurement is taken. A typical intermittent movement and a well known way to raise lamp voltage are illustrated in FIGURE 1a. The continuously rotating drive pin 29 engages the star wheel 30, moving it intermittently. When the star wheel 30 has come to rest, a cam 36 fastened to drive pin shaft 37 bears against contacts 38 and 39. Contact 38 shorts out resistor 40 which is connected in series with the filament of lamp 1. The lamp voltage is thus raised while the wiper and secondary light source is positioned opposite the face of the main prism, and lowered when it moves away. A second contact 39 connected in series with the photo tube 19 closes at the same time and thus activates the measuring circuit.

Having thus described my invention, what I claim is new and desire to secure by Letters Patent is:

1. A refractometer of the critical angle of total reflection type, said refractometer comprising a light source, a prism having a prism face in contact with a material whose index of refraction is to be measured, movable light reflecting means to receive light from said light source, said light reflecting means being driven by a driving mechanism to and from a measuring position and directing light through said material onto said prism face when occupying said measuring position, and switch means to increase the brightness of said light source, said switch means being actuated by said driving mechanism so as to increase said brightness when said light reflecting means are in said measuring position and to decrease said brightness when said light reflecting means are away from said measuring position.

2. A refractometer of the critical angle of total reflection type, said refractometer comprising a light source, a prism having a prism face in contact with a material whose index of refraction is to be measured, movable light reflecting means to receive light from said light source, said light reflecting means being driven by a driving mechanism to and from a measuring position and directing light through said material onto said prism face when occupying said measuring position, an electrical measuring circuit to measure the refractive index of said material, and switch means connected to said measuring circuit, said switch means being actuated by said driving mechanism so as to make said measuring circuit operative when said light reflecting means are in said measuring position, and to make said measuring circuit inoperative when said light reflecting means are away from said measuring position.

No references cited.